(12) United States Patent
Fux et al.

(10) Patent No.: US 8,689,101 B2
(45) Date of Patent: Apr. 1, 2014

(54) FONT DATA PROCESSING SYSTEM AND METHOD

(75) Inventors: Vadim Fux, Waterloo (CA); Denis Fedotenko, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1100 days.

(21) Appl. No.: 10/788,870

(22) Filed: Feb. 27, 2004

(65) Prior Publication Data

US 2005/0193336 A1 Sep. 1, 2005

(51) Int. Cl.
*G06F 17/00* (2006.01)

(52) U.S. Cl.
USPC .......................................... 715/269; 715/200

(58) Field of Classification Search
USPC ................... 715/542, 269, 256, 200; 709/228
See application file for complete search history.

(56) References Cited

U.S. PATENT DOCUMENTS

| | | | | |
|---|---|---|---|---|
| 5,206,736 | A * | 4/1993 | Simpson ....................... | 358/296 |
| 5,404,436 | A | 4/1995 | Hamilton | |
| 5,533,174 | A * | 7/1996 | Flowers et al. .............. | 358/1.15 |
| 5,577,177 | A | 11/1996 | Collins et al. | |
| 5,583,978 | A | 12/1996 | Collins et al. | |
| 5,586,242 | A * | 12/1996 | McQueen et al. ............ | 345/467 |
| 5,606,649 | A | 2/1997 | Tai | |
| 5,740,462 | A * | 4/1998 | Igarashi ......................... | 715/542 |
| 5,771,034 | A | 6/1998 | Gibson | |
| 5,781,714 | A * | 7/1998 | Collins et al. ................. | 345/471 |
| 5,859,648 | A | 1/1999 | Moore et al. | |
| 5,940,581 | A | 8/1999 | Lipton | |
| 6,023,714 | A | 2/2000 | Hill et al. | |
| 6,073,147 | A * | 6/2000 | Chan et al. .................... | 715/542 |
| 6,073,148 | A | 6/2000 | Rowe et al. | |
| 6,311,180 | B1 * | 10/2001 | Fogarty ............................ | 707/4 |
| 6,320,587 | B1 | 11/2001 | Funyu | |
| 6,421,717 | B1 * | 7/2002 | Kloba et al. .................. | 709/219 |
| 6,426,751 | B1 | 7/2002 | Patel et al. | |
| 6,553,412 | B1 * | 4/2003 | Kloba et al. .................. | 709/219 |
| 6,687,879 | B1 * | 2/2004 | Teshima ........................ | 715/542 |

(Continued)

FOREIGN PATENT DOCUMENTS

| | | |
|---|---|---|
| KR | 1998-18062 | 6/1998 |
| KR | 10-2003-0074860 | 9/2003 |
| WO | WO 2004/006166 A2 | 1/2004 |

OTHER PUBLICATIONS

Anonymous: "Font Reserve. White Paper. A Descriptive Overview of Font Sense Technology" 'Online! Mar. 4, 2003 XP-002288062 (2 pgs).

(Continued)

*Primary Examiner* — Manglesh M Patel

(74) *Attorney, Agent, or Firm* — Norton Rose Fulbright Canada LLP

(57) ABSTRACT

A method of facilitating the processing of font data for electronic data transfers to client devices includes storing a list of client font capabilities associated with one or more client devices, accessing font data in an electronic data transfer addressed to at least one client device, the at least one client device corresponding to the one or more client devices, comparing the accessed font data to the list of client font capabilities associated with the one or more client devices, and identifying augment font data based on the comparing the accessed font data to the list of client font capabilities associated with the one or more client devices. Augment font data is then included in the electronic data transfer to the at least one client device.

11 Claims, 7 Drawing Sheets

(56) References Cited

U.S. PATENT DOCUMENTS

| | | | |
|---|---|---|---|
| 6,718,519 B1* | 4/2004 | Taieb | 715/542 |
| 6,822,663 B2* | 11/2004 | Wang et al. | 715/854 |
| 7,010,587 B1* | 3/2006 | Shiimori | 709/223 |
| 7,155,672 B1* | 12/2006 | Adler et al. | 715/210 |
| 7,373,140 B1* | 5/2008 | Matsumoto | 455/414.4 |
| 2002/0010725 A1 | 1/2002 | Mo | |
| 2002/0087702 A1* | 7/2002 | Mori | 709/228 |
| 2002/0184270 A1* | 12/2002 | Gimson | 707/529 |
| 2002/0194261 A1 | 12/2002 | Teshima | |
| 2003/0046314 A1 | 3/2003 | Morooka | |
| 2005/0080839 A1* | 4/2005 | Kuwata et al. | 709/200 |
| 2006/0031452 A1* | 2/2006 | Shiimori | 709/223 |

OTHER PUBLICATIONS

Anonymous: "Font Reserve. White Paper. A Descriptive Overview of Font Reserve Server Technology" 'Online! Mar. 4, 2003 XP-002288063 (4 pgs).

Anonymous: "Font Reserve User's Guide" 'Online! Mar. 4, 2003 XP-002288064 (pp. i-167).

Anonymous: "Font Reserve Server 1.6—Version Tracker" 'Online! Jul. 12, 2004 XP-002288065 (2 pgs).

* cited by examiner

FONT DATA PROCESSING SYSTEM AND METHOD

BACKGROUND

1. Technical Field

This patent document generally relates to font data processing, and in particular relates to providing font data to client devices.

2. Description of the Related Art

A font is a set of characters of a particular typeface design and size. The typeface is the particular design of a set of printed characters, such as Courier, Helvetica or Times Roman. Related characters typically comprise a script, such as Latin, Greek, Hiragana, Katakana or Han, subsets of which are used to write a particular language. Glyphs are the visual element used to represent the characters; glyphs are the actual shape of a character image. Aspects of text presentation such as font and style apply to glyphs. For example, an italic Times font of the character "c" and a bold Times font of the character "c" each have corresponding glyphs.

There are three basic font types: Bitmap, Outline and Stroke. Bitmap fonts are stored as graphic images of characters with each point size of a typeface stored as a separate font. Each character is stored as an array of pixels (a bitmap). Outline fonts, such as TrueType™ fonts, are produced from information about the shape, or outline, of the glyphs. The outline is defined as a set of lines and curves. Outline fonts facilitate scaling and other effects better than bitmap fonts, and require less storage space than bitmap fonts. Stroke fonts are those in which the shapes of the characters, as represented by glyphs, are represented by strokes. A stroke is typically defined by a line and curves.

Fonts are typically stored in a memory in a client device. One such client device is a mobile communication device. Because a mobile device often has limited memory and processing resources, the number of fonts stored on the mobile device and the font processing capability of the mobile device is likewise limited.

Electronic data transfers addressed to the mobile device typically include font data for rendering text. Electronic data transfers may include e-mail messages, documents, Wireless Access Protocol (WAP) decks, or other types of transmitted electronic data. The font data may comprise the actual font data structure, e.g., an entire set of characters of a particular typeface design and size, or may instead comprise an identifier of a particular font type, e.g., Courier 12 point. If the font data in the electronic data transfer identifies a font type to be used to render text associated with the electronic data transfer, but does not include the actual font data, then the actual font data must be available in the mobile device memory for the text to be rendered correctly. If the mobile device memory does not include the actual font data of the font type to be used, then the text may be rendered incorrectly, and/or the mobile device may have to issue a request for the actual font data after receiving the electronic data transfer.

SUMMARY

A system for facilitating the processing of font data for electronic data transfers to client devices comprises a client font list store and font processing software. The client font list store comprises a list of client font capabilities associated with one or more client devices. The font processing software causes a processing device to receive an electronic data transfer addressed to at least one client device corresponding to the one or more client devices, to determine augment font data by accessing font data in the electronic data transfer and comparing the accessed font data to the list of client font capabilities associated with the one or more client devices, and to include the augment font data in the electronic data transfer to the at least one client device.

A method of facilitating the processing of font data for electronic data transfers to client devices comprises storing a list of client font capabilities associated with one or more client devices, accessing font data in an electronic data transfer addressed to at least one client device, the at least one client device corresponding to the one or more client devices, comparing the accessed font data to the list of client font capabilities associated with the one or more client devices, and identifying augment font data based on the comparing the accessed font data to the list of client font capabilities associated with the one or more client devices. Augment font data is then included in the electronic data transfer to the at least one client device.

DETAILED DESCRIPTION

Figure 1:
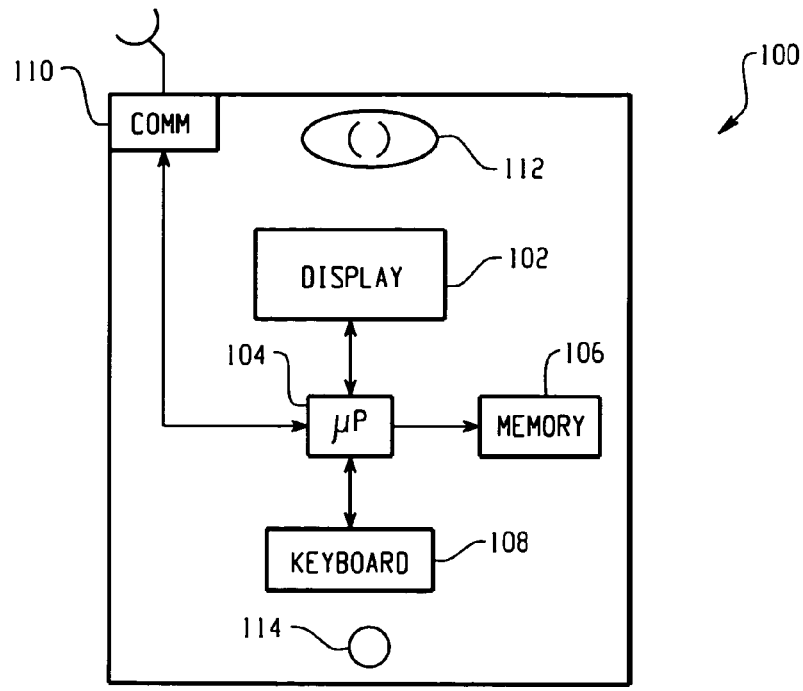
FIG. 1 is a block diagram of a mobile device.

FIG. 1 is a block diagram of a mobile device 100. The mobile device 100 may comprise a display subsystem 102, a processing subsystem 104, a memory subsystem 106, a keyboard subsystem 108, and a communication subsystem 110. The mobile device 100 may be any mobile communication device adapted to operate within a wireless communication network and is preferably a two-way communication device. An audio subsystem comprising a speaker 112 and a microphone 114 may also be included if the mobile device 100 supports voice communication functions. The mobile device 100 may be operable to communicate with an associated server over one or more communication networks. A more detailed description of the mobile device 100 and an exemplary operating environment for the mobile device 100 is described with respect to FIGS. 8 and 9 below.

Depending on the functionality provided by the mobile device 100, the mobile device 100 may be referred to as a data messaging device, a two-way pager, a cellular telephone with data messaging capabilities, a wireless Internet appliance or a data communication device (with or without telephony capabilities). Data communication functions, such as e-mail, instant messaging, paging, and the like, are primarily facilitated by the display subsystem 102, the keyboard subsystem 108, and the communication subsystem 110, which provide the primary user interface and communication capability for composing, reading and replying to data communications. Voice communication functions are further facilitated by the audio subsystem comprising the speaker 112 and the microphone 114.

The memory subsystem 106 stores mobile device program code comprising program instructions that are executable by the processing subsystem 104. The mobile device 100 is thus a programmable device that may be programmed to carry out multiple functions upon execution of the mobile device program code by the processing subsystem 104. The memory subsystem 106 may also store font data that defines certain fonts and is used to render text as glyphs. An application program may also be stored in the memory subsystem 106, and may be operable to access the font data of the text from the memory subsystem 106 and render the text into glyphs that are displayed on the display subsystem 102.

Figure 2:
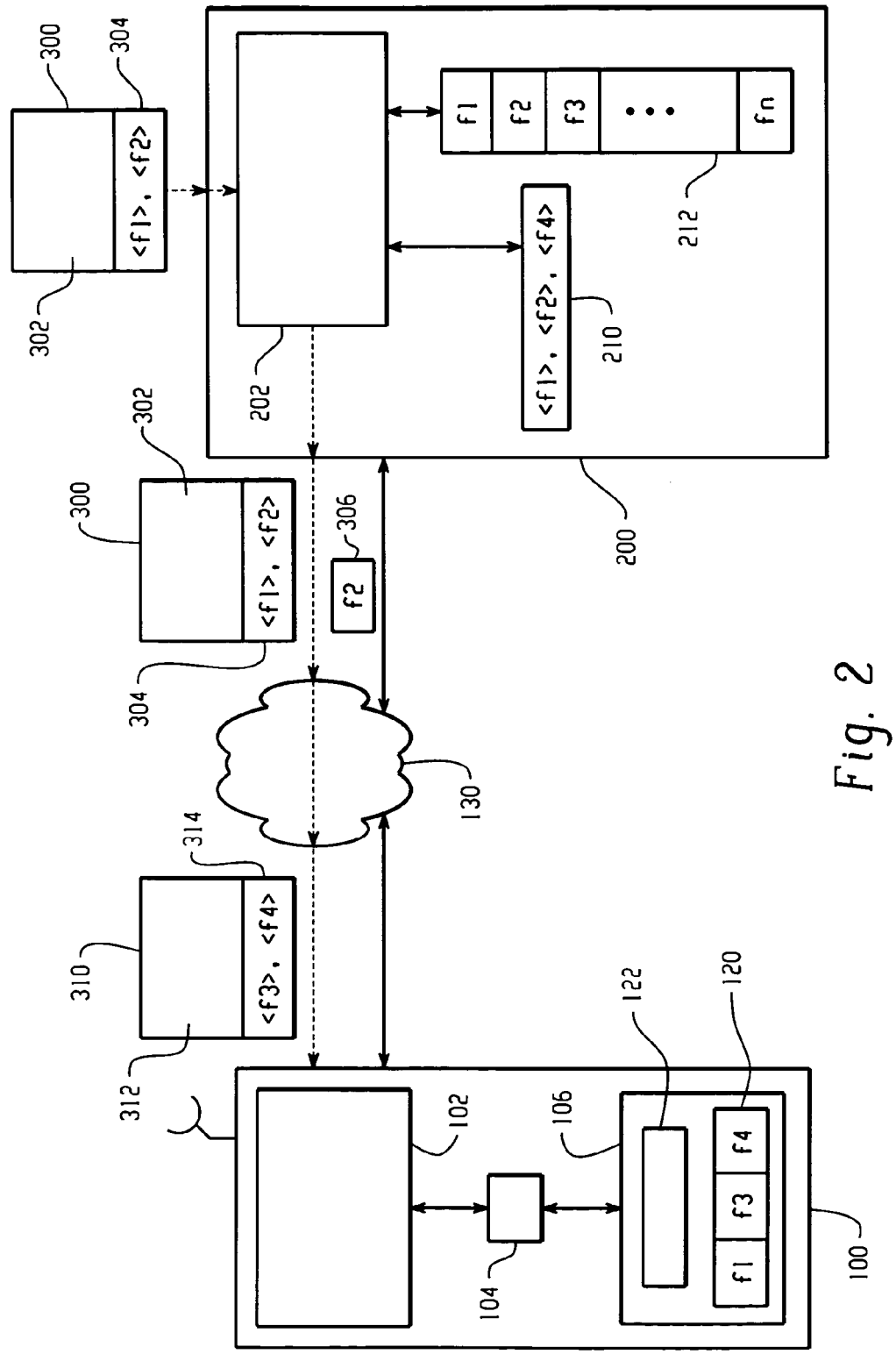
FIG. 2 is a system diagram of a font data processing system operable to support font processing on the mobile device of FIG. 1.

FIG. 2 is a system diagram of a font data processing system operable to support font processing on the mobile device 100 of FIG. 1. The mobile device 100 has stored in the memory subsystem 106 a client font data store 120 for a plurality of font types f1, f3, and f4. The client font data store 120 may comprise bitmap, outline and/or stroke font data for the font types f1, f3 and f4, i.e., the actual font data structure, and is used by the processing subsystem 104 to render the correct typeface design and size of text on the display subsystem 102.

The mobile device 100 may communicate with a server 200 over a network 130. The network may be realized by a wireless network, such as an wireless LAN, or a combination of a wired and wireless network, such as a cellular network and the Internet. A typical server computer system 200 comprises a memory subsystem, a processing subsystem, and a communication subsystem. The server 200 comprises font processing software 202 stored in a computer readable medium. The font processing software 202 has access to a client font list store 210. The client font list store 210 comprises a list of client font capabilities associated with the mobile device 100. For example, as shown in FIG. 2, the client font data store 120 stores font data for a plurality of font types f1, f3, and f4. An associated client font list store 210 may comprise a list of font identifiers <f1>, <f3> and <f4> that identify the font types f1, f3 and f4 of the client font data store 120. Thus, if the font types f1, f3 and f4 correspond to Helvetica, Courier and Times fonts, respectively, then the list of identifiers <f1>, <13> and <f4> identify Helvetica, Courier and Times fonts, respectively. The identifiers may include further detail, such as the basic font type, e.g., bitmap, outline, or stroke, etc. In one embodiment, the list of identifiers <f1>, <f3> and <f4> may be provided by the server 200 during the initiation of a communication session with the mobile device 100. In another embodiment, the list of identifiers <f1>, <f3> and <f4> may be stored on the server 200 in a device profile associated with the mobile device 200.

The server 200 also includes a server font data store 212 that stores server font data for a plurality of font types f1, f2, f3 ... fn. The server font data store 212 may comprise bitmap, outline and/or stroke font data for the font types f1, f2, f3 ... fn, and may also comprise font provider access data that allows the server to access a third-party server to receive font data for a particular font type.

In operation, the server 200 receives an electronic data transfer 300 that is addressed to the mobile device 100, or to an address associated with the mobile device 100. The electronic data transfer 300 may include e-mail messages, documents, Wireless Access Protocol (WAP) decks, or other types of transmitted electronic data, and comprises text data 302 and font data 304. The font data 304 may comprise embedded font data, such as an actual font data structure e.g., an entire set or subset of characters of a particular typeface design and size, or may instead comprise non-embedded font data, such as an identifier of a particular font type, e.g., Courier 12 point. The font data 304 is used to render the text data 302 according to particular font types, e.g., font types f1 and f2.

Upon receiving the electronic data transfer 300, the font processing software 202 determines augment font data by accessing the font data 304 in the electronic data transfer 300 and comparing the font data 304 to the list of client font capabilities in the client font list store 210. Augment font data is font data that is provided to the mobile device 100 in addition to the electronic data transfer 300 so that the mobile device 100 may render the text data 302 according to the correct typeface design and size as specified by the font data 304.

If the font data 304 comprises the entire set of characters of a particular typeface design and size, then the font is embedded in the document and augment font data is not required. However, if the font data 304 comprises only an identifier of a particular font type, e.g., identifiers <f1> and <f2> as shown in FIG. 2, then augment font data may be required if the mobile device 100 does not have the particular typeface design and size of the specified font stored in the client font data 120.

In the example shown in FIG. 2, the font data 304 comprises non-embedded font data identifiers <f1> and <f2> that specify particular font types f1 and f2. Because the client font data store 120 includes the font data structure for font type f1, augment font data is not needed for this font type. The client font data store 120, however, does not include the font data structure for font type f2, and thus augment font data is needed for font type f2. Accordingly, the font processing software 202 selects the font data structure for font type f2 stored in the server font data store 212 as augment font data 306, and includes the augment font data 306 with the electronic data transfer. Another electronic data transfer 310, comprising text data 312 and font data 314, may be transmitted to the mobile device 100 without any augment font data, as the client font data 120 includes the font data structures for the font types f3 and f4, which are specified by the identifiers <f3> and <f4> in the font data 314.

By operation of the font processing software 202 as described above, and by reference of the client font list store 210 and the server font data store 212, augment font data may be provided with an electronic data transfer to a mobile device 100 so that the mobile device 100 may correctly and accurately render text data. Furthermore, the font processing software 202 does not provide augment font data if the font data is not required, such as in the case of the mobile device 100 already having stored therein the required font data, or in the case of the electronic data transfer already having stored therein the required font data. A Portable Document Format (PDF) file is an example of this latter case.

The font processing software 202 may embed the augment font data into the electronic data transfer 300 to create a font-augmented electronic data transfer. Alternatively, the augment font data may be sent as a font attachment to the electronic data transfer 300. The font attachment may include an identifier indicating that the attachment includes augment font data, and the mobile device 100 may include mobile device font processing software 122 that automatically processes the attachment based on the identifier. The mobile device font processing software 122 may store the augment font data in a temporary cache for use in rendering text in the electronic data transfer.

In another embodiment, the mobile device font processing software 122 may automatically update the font capabilities of the mobile device 100 by permanently storing the augment font data in the font attachment as another font in the client font data store 120. In this embodiment, the font processing software 202 may automatically update the client font list store 210 to include the newly added augment font data as an additional font processing capability on the mobile device 100, or may update the client font list store 120 upon receiving a confirmation of acceptance of the augment font data from the mobile device 100.

While only one mobile device 100 is shown in FIG. 2, the server 200 may operate in conjunction with a plurality of mobile devices 100. The client font list store 210 may comprise a list of client font capabilities associated with one or more mobile devices to support font processing for a plurality of mobile devices 100.

Figure 3:
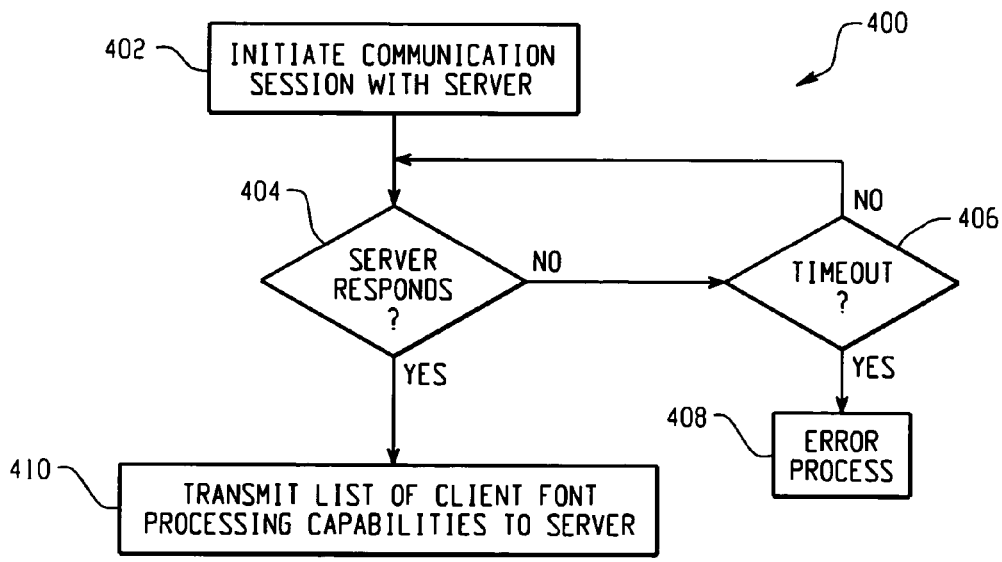
FIG. 3 is a client-side flow diagram of a communication session initiation.

FIG. 3 is a client-side flow diagram 400 of a communication session initiation. A communication session initiation occurs when a client, such as the mobile device 100, attempts to secure a network resource so that the client may send and receive data over one or more communication networks. In this embodiment, the client provides a list of font processing capabilities to the server during the communication session initiation.

At step 402, the client initiates a communication session with the server. At step 404, the client monitors for a response from the server. If no response is received, then step 406 determines if a timeout has occurred. If a timeout has not occurred, step 404 continues. If a timeout has occurred, then an error process 408 is executed. The error process 408 may generate one of a plurality of error processing messages, such as out of cellular coverage, lack of available network resources, and the like, depending on the cause of the timeout and the particular client device. If the server does respond before the timeout condition occurs, however, then in step 410 the client transmits the list of client font processing capabilities to the server.

Figure 4:
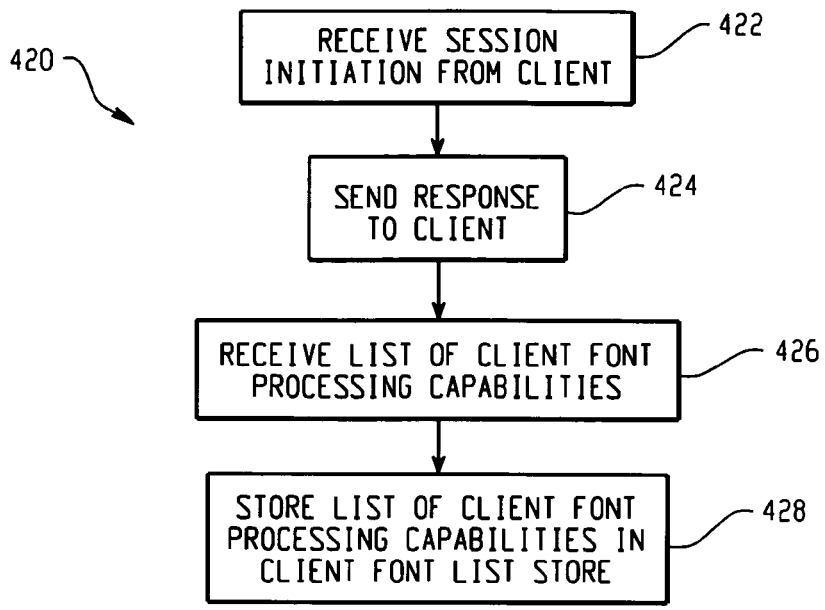
FIG. 4 is a server-side flow diagram of a communication session initiation.

FIG. 4 is a server-side flow diagram 420 of a communication session initiation with a client, such as the mobile device 100. In step 422, the server receives a session initiation from the client. In step 424, the server sends a response to the client. In step 426, the server receives a list of client font processing capabilities. In step 428, the server stores the list of client font processing capabilities in a client font list store.

In another embodiment, the client has an associated client profile stored on the server. The client profile includes a list of font processing capabilities associated with the client, and thus the client need not provide a list of font processing capabilities each time a communication session is initiated. The client profile may be updated each time the client font processing capabilities change, however, such as when font data structures are added or removed from the client font data store.

Figure 5:
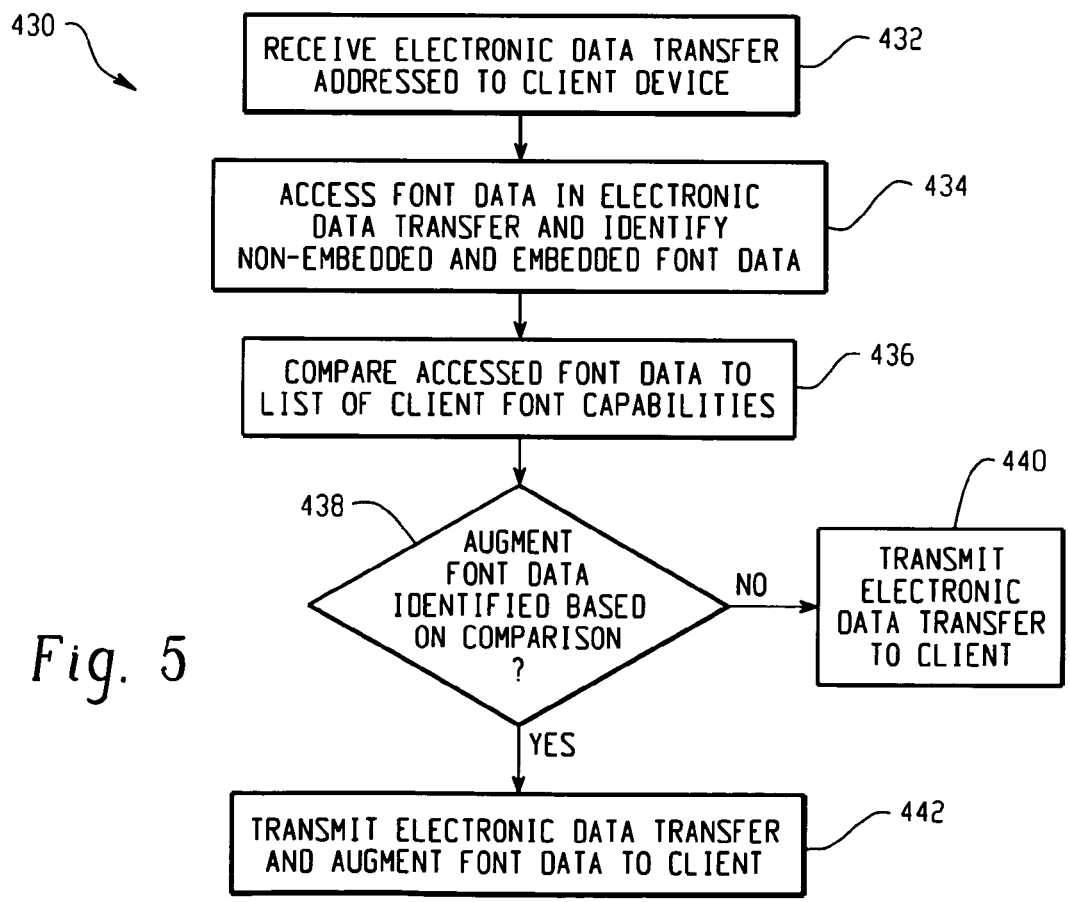
FIG. 5 is a flow diagram of a process for identifying augment font data.

FIG. 5 is a flow diagram 430 of a process for identifying augment font data. In step 432, the server receives an electronic data transfer address to the client device. In step 434, the server accesses the font data in the electronic data transfer and identifies embedded and non-embedded font data. Embedded font data need not be augmented, as the electronic data transfer includes the actual font data structure for proper text rendering by the client.

In step 436, the server compares the accessed font data to the list of client font processing capabilities, and identifies any augment font data required for the non-embedded font data in the electronic data transfer. Step 438 determines if augment font data has been identified in step 436. If no augment font data has been identified, then the client has all font processing capabilities required to properly render the text of the electronic data transfer. Step 440 is thus executed, and the electronic data transfer is transmitted to the client.

If augment font data has been identified, then the client does not have all font processing capabilities required to properly render the text of the electronic data transfer. Accordingly, step 442 is executed, and the electronic data transfer and the augment font data are transmitted to the client.

Figure 6:
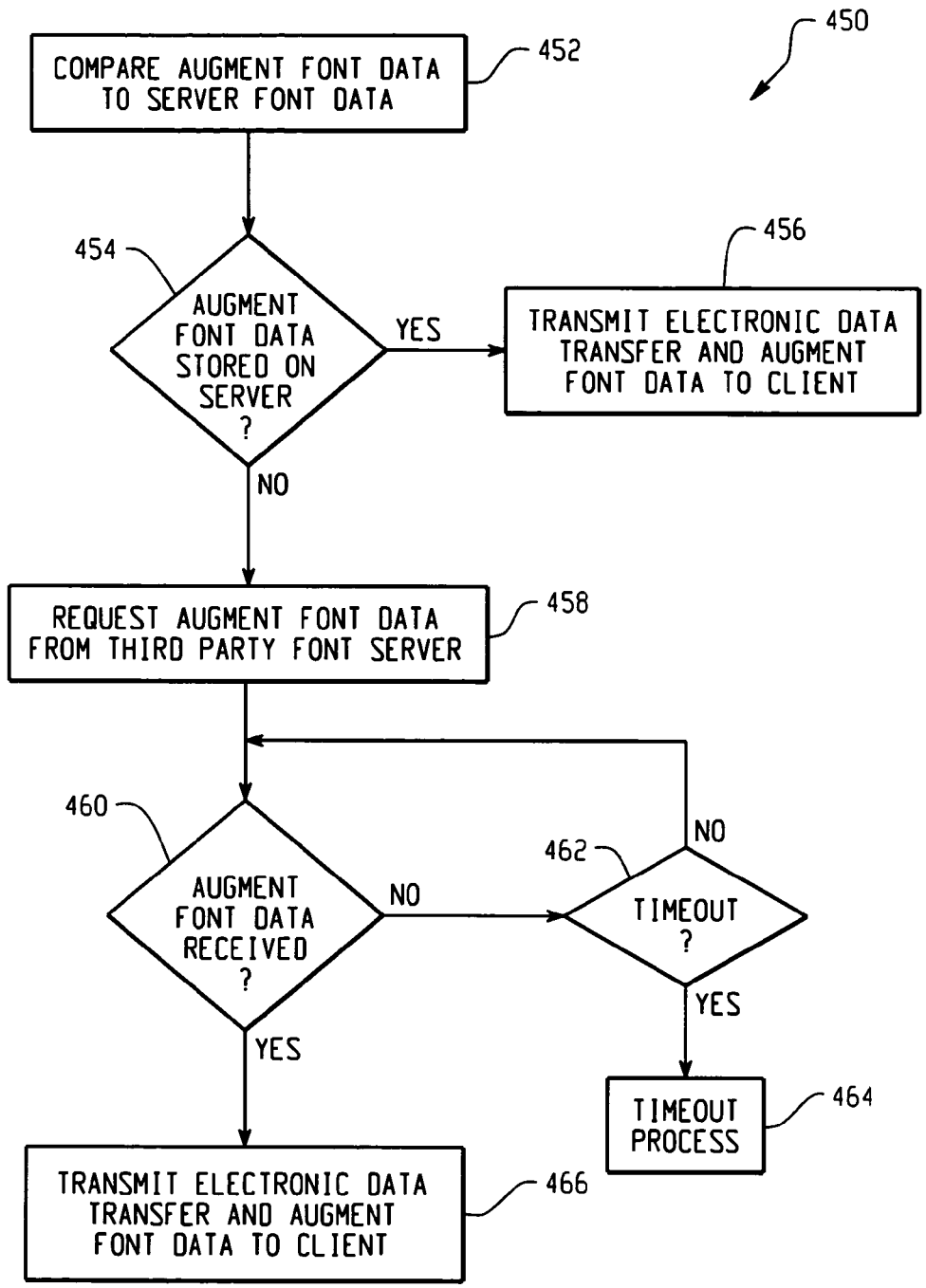
FIG. 6 is a flow diagram of a process for providing augment font data.

FIG. 6 is a flow diagram 450 of a process for providing augment font data. In the embodiment shown in FIG. 6, augment font data may be stored either on the server, or on a third-party font server. Because some fonts may be protected by one or more intellectual property rights, a third party owner of these rights may establish conditions for accessing and/or using the font. Alternatively, the font may not be stored on the server, but may be freely available on the third-party font server.

Step 452 compares the identified augment font data to the server font data, and step 454 determines if the identified augment font data is stored on the server. If the augment font data is stored on the server, then step 456 is executed, and the electronic data transfer and the augment font data are transmitted to the client.

If the augment font data is not stored on the server, however, then the server requests the augment font data from a third-party font server in step 458. Step 460 monitors if the augment font data is received. If augment font data is not received, then step 462 determines if a timeout has occurred. If a timeout has not occurred, step 460 continues. If a timeout has occurred, however, then a timeout process 464 is executed. The timeout process 464 may generate one of a plurality of error processing messages and execute one or more error processing routines. Alternatively, the timeout process may simply send the electronic data transfer without augment font data. If the augment font data is received before the timeout condition occurs, however, then in step 466 electronic data transfer and the augment font data is transmitted to the client.

Figure 7:
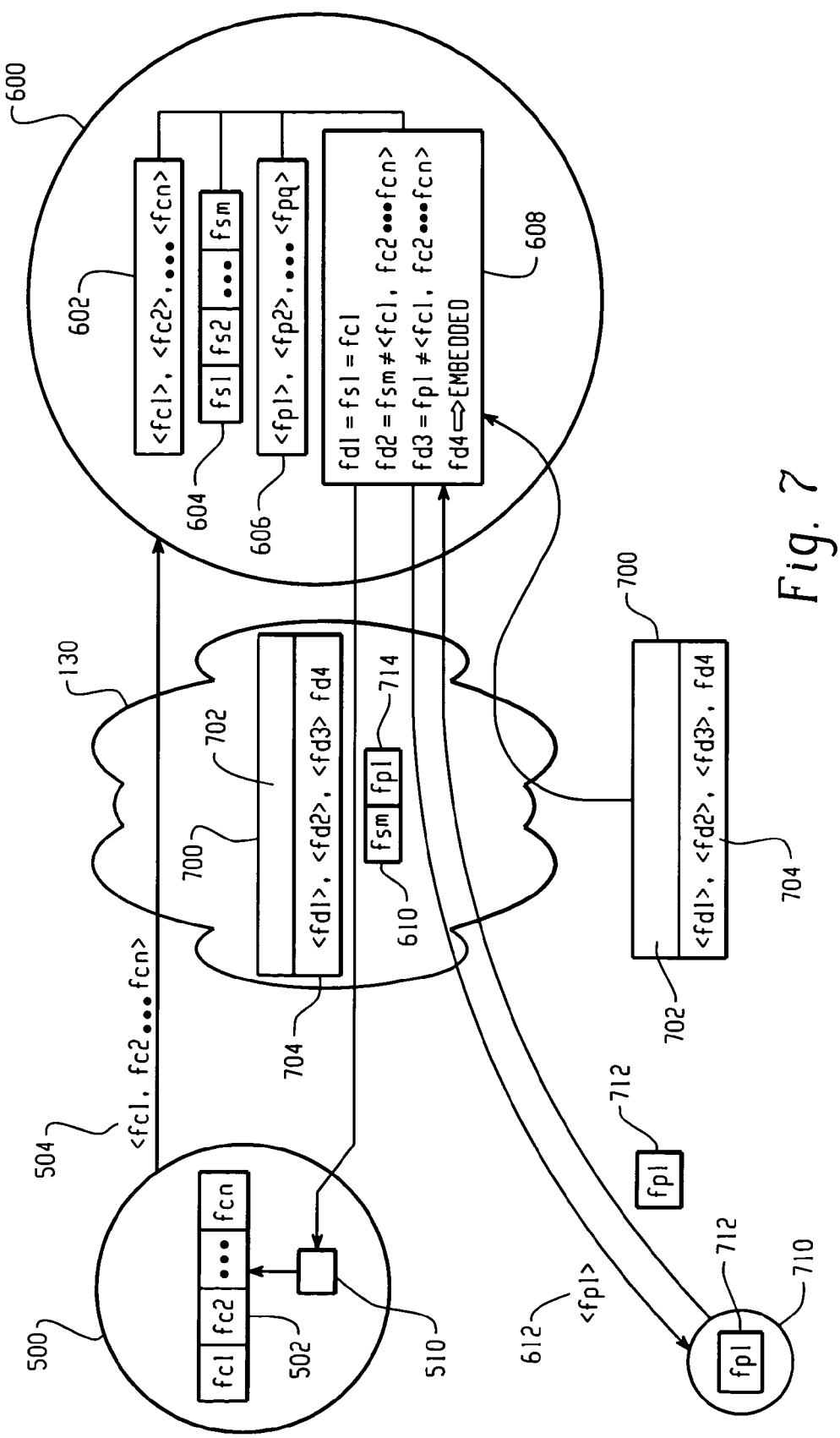
FIG. 7 is a structure block diagram of a font data processing system operable to support font processing on a client device.

FIG. 7 is a structure block diagram of another embodiment of a font data processing system operable to support font processing on a client device 500. The client device 500 communicates with the server 600 over a network 130. The network may be a wireless network, a wired network, or a combination wired and wireless networks. The client 500 includes a client font data store 502 for a plurality of font types fc1, fc2 . . . fcn. The client font data store 502 may comprise bitmap, outline and/or stroke font data for the font types fc1, fc2 . . . fcn, i.e., the actual font data structure, and is used by the client 500 to render the typeface design and size of text.

The server 600 may be a typical server computer or gateway device and comprises a client font list store 602, a server font data store 604, a provider font list store 606, and font processing software 608 that has access to the client font list store 602, the server font store 604, and the provider font list store 606.

The client font list store 602 comprises a list of client font capabilities associated with the client 500. For example, as shown in FIG. 7, the client font data store 502 for a plurality of font types fc1, fc2 . . . fcn has an associated client font list store 602 comprising a list of identifiers <fc1>, <fc2> . . . <fcn> that identify the font types fc1, fc2 . . . fcn of the client font data store 502. Thus, if the font types fc1, fc2 . . . fcn correspond to Helvetica, Courier and Times fonts, respectively, then the list of identifiers <fc1>, <fc2> . . . <fcn> identify Helvetica, Courier and Times fonts, respectively. The identifiers may include further detail, such as the basic font type, e.g., bitmap, outline, or stroke, etc. In one embodiment, the list of identifiers <fc1>, <fc2> ... <fcn> may be provided by the server 600 during the initiation of a communication session with the client 500. In another embodiment, the list of identifiers <fc1>, <fc2> ... <fcn> may be stored on the server 600 in a client profile associated with the client 500.

The server font data store 604 stores server font data for a plurality of font types fs1, fs ... fsm. The server font data store 604 may comprise bitmap, outline and/or stroke font data for the font types fs1, fs2 ... fsm. The provider font list store 606 stores font provider access data that allows the server 600 to access one or more third-party servers, such as font provider server 710, to receive font data for particular font types fp1, fp2 ... fpq.

In operation, the server 600 receives an electronic data transfer 700 that is addressed to the client 500, or to an address associated with the client 500. The electronic data transfer 700 may include e-mail messages, documents, Wireless Access Protocol (WAP) decks, or other types of transmitted electronic data, and comprises text data 702 and font data 704. The font data 704 may comprise embedded font data, such as an actual font data structure, e.g., an entire set or subset of characters of a particular typeface design and size, or may instead comprise non-embedded font data, such as an identifier of a particular font type, e.g., Courier 12 point. The font data 704 is used to render the text data 702 according to particular font types, e.g., font types fd1, fd2, f3, and fd4. As shown in FIG. 7, the font data 704 includes non-embedded font identifiers <fd1>, <fd2>, and <fd3>, and embedded font data fd4.

Upon receiving the electronic data transfer 700, the font processing software 608 determines augment font data by accessing the font data 704 in the electronic data transfer 700 and comparing the font data 704 to the list of client font capabilities in the client font list store 602. Augment font data is font data that is provided to the client 500 so that the client 500 may render the text data 702 according to the correct typeface design and size as specified by the font data 704. If the font data 704 is embedded, augment font data is not required. However, if the font data 704 comprises only an identifier of a particular font type, e.g., identifiers <fd1>, <fd2> and <fd3> as shown in FIG. 7, then augment font data may be required if the client 500 does not have the particular typeface design and size of the specified font stored in the client font data store 502.

In the example shown in FIG. 7, the client font data 704 comprises non-embedded font data identifiers <fd1>, <fd2> and <fd3> that specify particular font types fd1, fd2, and fd3. The font processing software 608 compares the non-embedded font data identifiers <fd1>, <fd2> and <fd3> to the server font data store 604 and the provider font list store 606. Based on this comparison, the font processing software 608 determines that the font types fd1, fs1 and fc1 are the same, e.g., Helvetica 12-point. Furthermore, because the client font data store 502 includes font data for font type fc1, augment font data for this font type is not required.

The font processing software 608 also determines that the font type fd2 and fsm are the same, and that this particular font type is not specified in the client font list store 602. Accordingly, the client 500 does not have font data for font type fd2 stored in the client font data store 502, and thus augment font data is required. The server 600 has font data for the font type fsm stored in the server font data store 604, and thus augment font data 610 for the font type fsm is transmitted from the server 600 with the electronic data transfer 700.

The font processing software 608 also determines that the font type fd3 and fp1 are the same, and that this particular font type is not specified in the client font list store 602. Accordingly, the client 500 does not have font data for font type fd2 stored in the client font data store 502, and augment font data is required. The server 600, however, does not have font data for the font type fp1 stored in the server font data store 604. The font data is available from a third-party font provider server 710, however, as indicated by the <fp1> identifier in the corresponding font provider access data 606. The server 600 transmits a font request 612 to the font provider 710. The font provider 710, in turn, accesses the font data 712 for font type fp1 and provides the font data 712 to the server 600. The font data 712 is, in turn, included as augment font data 714 with the electronic data transfer 700.

Finally, the font processing software 608 determines that the font data fd4 is embedded font data, and thus augment data for this font type is not required, regardless of whether the client 500 has corresponding font data stored in the client font data store 502.

The font processing software 608 may embed the augment font data into the electronic data transfer 700 to create a font-augmented electronic data transfer. Alternatively, the augment font data may be sent as a font attachment to the electronic data transfer 700. The font attachment may include an identifier indicating that the attachment includes augment font data, and the client 500 may include client font processing software 510 that automatically processes the attachment based on the identifier. The client font processing software 510 may store the augment font data in a temporary cache for use in rendering text in the electronic data transfer.

In another embodiment, the client font processing software 510 may automatically update the font capabilities of the client 500 by permanently storing the augment font data in the font attachment as another font in the client font data store 502. In this embodiment, the font processing software 608 may automatically update the client font list store 602 to include the newly added augment font data as an additional font processing capability on the client 500, or may update the client font list store 602 upon receiving a confirmation of acceptance of the augment font data from the client 500.

By operation of the font processing software 608 as described above, and by reference of the client font list store 602, the server font data store 604, and the provider font list store 606, augment font data may be provided with an electronic data transfer 700 to a client 500 so that the client 500 may correctly and accurately render text data. Furthermore, the font processing software 608 does not provide augment font data if the font data is not required, such as in the case of the client 500 already having stored therein the required font data, or in the case of the electronic data transfer having embedded font data.

While only one client 500 is shown in FIG. 7, the server 600 may operate in conjunction with a plurality of clients 500. The client font list store 602 may comprise a list of client font capabilities associated with one or more clients to support font processing for a plurality of clients 500.

Figure 8:
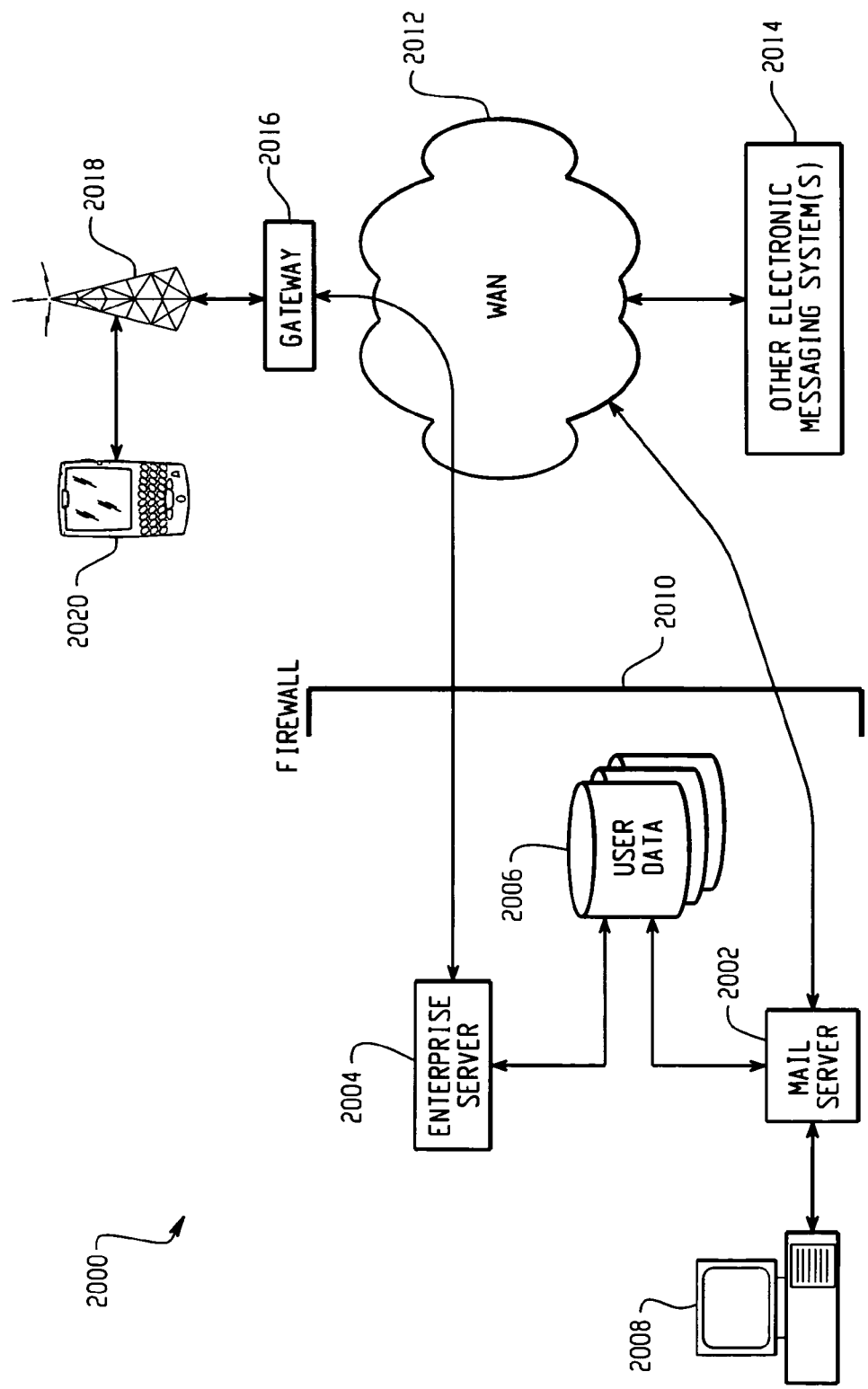
FIG. 8 is a block diagram of an example system for redirecting electronic messages to and from the mobile device of FIG. 1.

FIG. 8 is a block diagram of an example redirector system 2000 for redirecting electronic messages to and from a mobile communication device 2020. The mobile device of FIG. 1 may be used in the example system 2000 of FIG. 8. The example redirection system 2000 includes an enterprise server 2004, a mail server 2002, a storage medium 2006 for electronic messaging (e.g., e-mail), account data, and a wireless gateway 2016. Also illustrated are the mobile communication device 2020, a wireless network 2018, a wide area network (WAN) 2012, a firewall 2010, a desktop client 2008, and one or more other electronic messaging systems 2014. The server 200 of FIG. 2 or the server 600 of FIG. 7 may be implemented in either the mail server 2002 or the enterprise server 2004.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic messages addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packet(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 9:
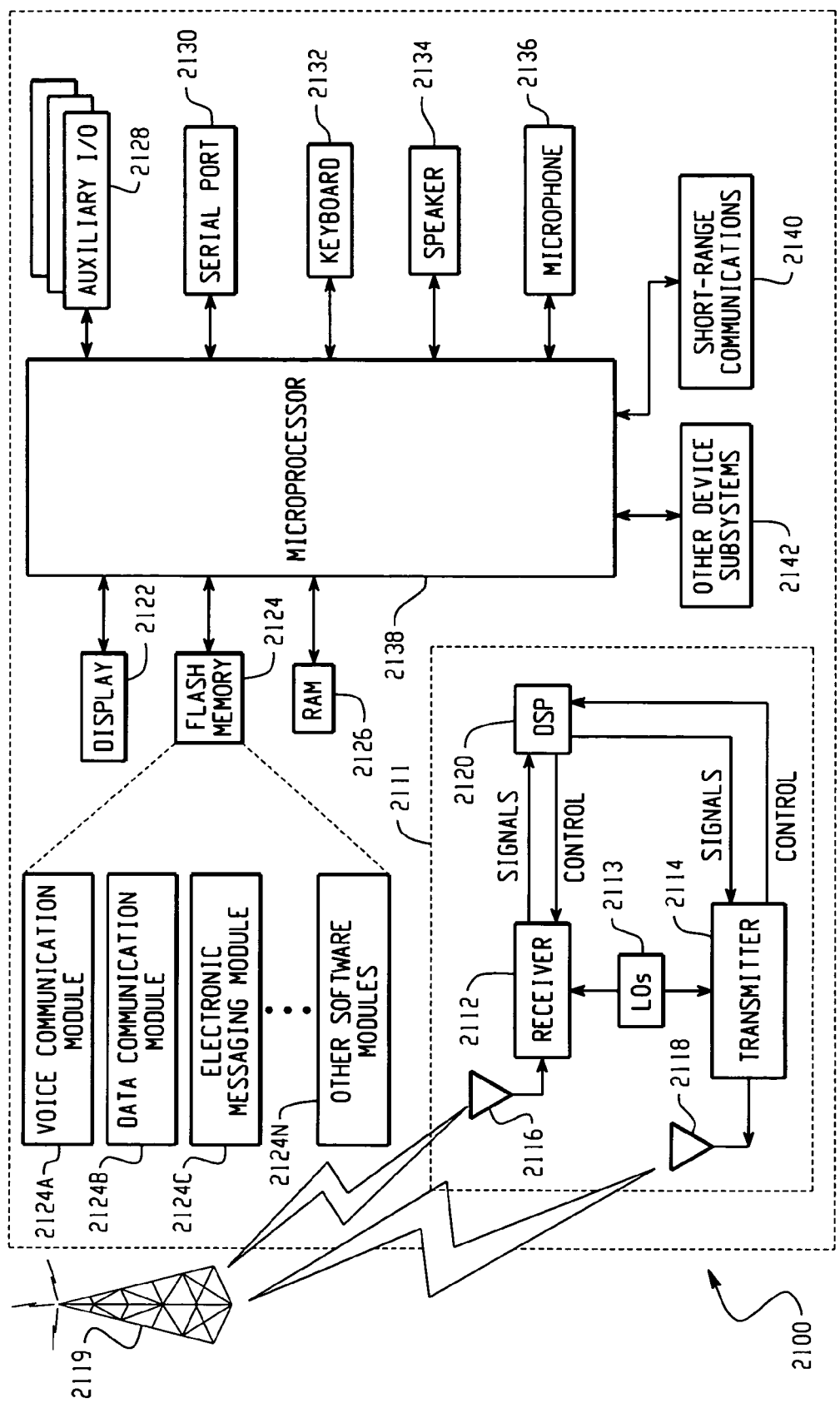
FIG. 9 is a more detailed block diagram of the mobile device of FIG. 1.

FIG. 9 is a block diagram illustrating an example mobile communication device 2100. The block diagram for the example mobile communication device 2100 can be considered a more detailed block diagram of the mobile device 100 of FIG. 1. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, a CDMA network, an iDEN network, and/or an EDGE network.

Network access requirements vary depending upon the type of communication system. For example, in the Mobitex and DataTAC networks, mobile devices are registered on the network using a unique personal identification number or PIN associated with each device. In UMTS and GSMIGPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

The apparatus, methods, and flow diagrams and structure block diagrams described in this patent document may be implemented in the mobile devices, servers and gateways described herein by program code comprising program instructions that are executable by processing subsystems. Other implementations may also be used, however, such as firmware or even appropriately designed hardware configured to carry out the methods and flow diagrams described in this patent document. Additionally, the flow diagrams and structure block diagrams described in this patent document, which describe particular methods and/or corresponding acts in support of steps and corresponding functions in support of disclosed structures, may also be utilized to implement corresponding software structures and algorithms, and equivalents thereof. Furthermore, the apparatus and methods described in this patent document may be implemented in other computing devices besides mobile devices, such as a laptop or desktop computer communicating with one or more servers over a LAN, WAN, or other computer network.

Additionally, while the systems and methods described herein have been illustrated as identifying and facilitating different font types (e.g., a particular font, or a particular font, font size, and style, etc.), the systems and methods may be applied to facilitate the processing of particular character scripts. For example, if the mobile device supports an Arial bold font for Latin-1 script, and a document requires and Arial bold font for a Latin-2 script, the system and methods may be adapted to provide Latin-2 script data to the mobile device as appropriate.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A method comprising:
   (i) for each of a plurality of client devices, storing a corresponding client profile at a server, each corresponding client profile comprising a font capabilities list for a respective one of the plurality of client devices, each font capabilities list comprising a list of fonts for which the respective client device has font structure data stored in a client font data store of the respective client device, the font structure data defining the structure in which text formatted with the respective font is to be rendered on the respective client device;
   (ii) receiving an electronic data transfer at the server, addressed to a designated one of the plurality of client devices, the electronic data transfer comprising text data and one or more font identifiers identifying one or more fonts to use to render the text data on the designated one of the plurality of client devices;
   (iii) comparing the one or more font identifiers in the electronic data transfer with a current version of the fonts in the capabilities list stored by the server for the designated device, to determine fonts in the electronic data transfer for which the designated device lacks font structure data;
   (iv) transferring, from the server to the designated device, the font structure data of the fonts determined to be lacked by the designated device and the text data, wherein the font structure data lacked by the designated device and the text data are included in the same electronic data transfer, and wherein the designated device stores the received font structure data in the client font data store; and
   (v) updating the font capabilities list stored by the server for the designated device to include, in a new version of the font capabilities list, the fonts whose font structure data are transferred to the designated device.

2. The method of claim 1 wherein, in step ii, the server receives, in the electronic data transfer, the text data along with corresponding font structure data for each of the one or more font identifiers, and, in step iv, the server operatively refrains from transferring, to the designated device, the corresponding font structure data for each font having font structure data determined by the server in the comparing step to already be stored in the client font data store on the designated device.

3. The method of claim 1 further comprising, between steps iii and iv:
   requesting and receiving from another server the font structure data of the fonts determined to be lacked by the designated device.

4. The method of claim 1 further comprising between steps iii and iv:
   determining whether another font identifier exists that is the same as the font identifier for which font structure data is lacking.

5. The method of claim 1 further comprising a step, performed before step (i), of:
   receiving from each of the plurality of client devices a corresponding initial version of the font capabilities list.

6. The method of claim 1 wherein each of the plurality of client devices are wireless mobile communication devices.

7. The method of claim 1 further comprising a step, performed before step (i), of:
   receiving from each of the plurality of client devices a corresponding initial version of the font capabilities list.

8. The method of claim 1 wherein each of the plurality of client devices are wireless mobile communication devices.

9. A method comprising:
   (i) for each of a plurality of client devices, storing a corresponding client profile at a server, each corresponding client profile comprising a font capabilities list for a respective one of the plurality of client devices, each font capabilities list comprising a list of fonts for which the respective client device has font structure data stored in a client font data store of the respective client device, the font structure data defining the structure in which text formatted with the respective font is to be rendered on the respective client device;
   (ii) receiving an electronic data transfer at the server, addressed to a designated one of the plurality of client devices, the electronic data transfer comprising text data and one or more font identifiers identifying one or more fonts to use to render the text data on the designated one of the plurality of client devices;
   (iii) comparing the one or more font identifiers in the electronic data transfer with a current version of the fonts in the capabilities list stored by the server for the designated device, to determine fonts in the electronic data transfer for which the designated device lacks font structure data;
   (iv) determining that one of the fonts in the electronic data transfer has an equivalent font that is not included in the current version of the font capabilities list stored by the server for the designated device or in the electronic data transfer;
   (v) transferring, from the server to the designated device, the font structure data of the equivalent font and the text data, wherein the font structure data of the equivalent font and the text data are included in the same electronic data transfer, and wherein the designated device stores the received font structure data in the client font data store; and
   (vi) updating the font capabilities list stored by the server for the designated device to include, in a new version of the font capabilities list, the equivalent font whose font structure data is transferred to the designated device.

10. The method of claim 9 wherein, in step ii, the server receives, in the electronic data transfer, the text data along with corresponding font structure data for each of the one or more font identifiers, and, in step v, the server operatively refrains from transferring, to the designated device, the corresponding font structure data for each font having font structure data determined by the server in the comparing step to already be stored in the client font data store on the designated device.

11. The method of claim 9 further comprising, between steps iv and v:
   requesting and receiving from another server the font structure data of the equivalent font.

* * * * *